Oct. 19, 1954 J. VAN TASSEL 2,692,161
MULTIPLE-ROOM EXPANSIBLE HOUSE TRAILER
Filed March 3, 1951 2 Sheets-Sheet 1
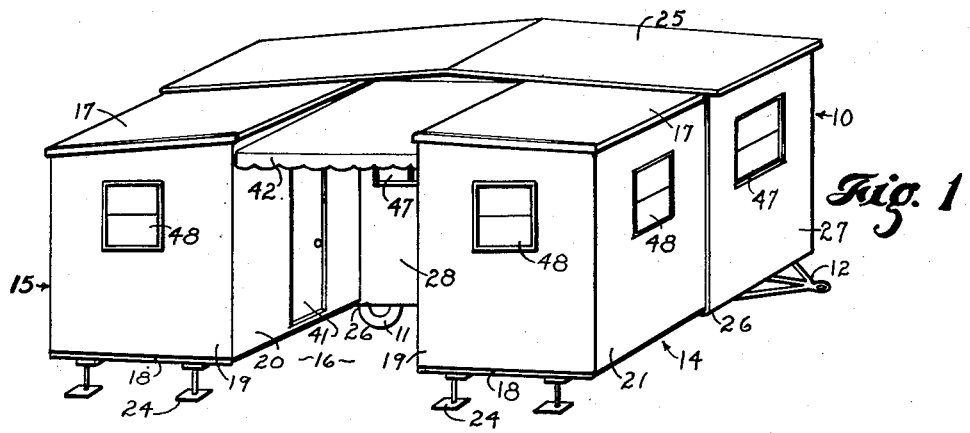
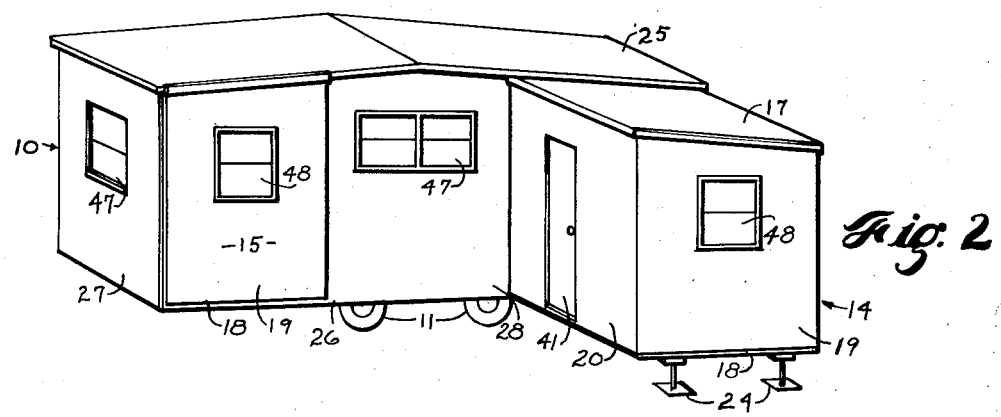
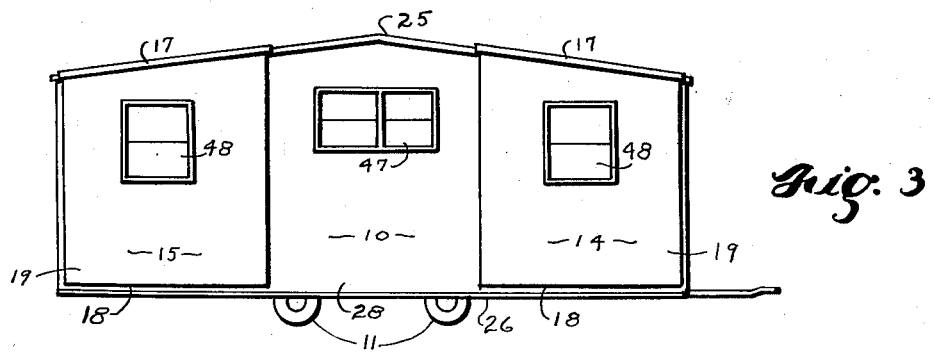
INVENTOR.
James Van Tassel
BY
Stedman B. Hoar
Agent Oct. 19, 1954 J. VAN TASSEL 2,692,161
MULTIPLE-ROOM EXPANSIBLE HOUSE TRAILER
Filed March 3, 1951 2 Sheets-Sheet 2

INVENTOR.
James Van Tassel
BY Stedman B Hoar
Agent

Patented Oct. 19, 1954

2,692,161

UNITED STATES PATENT OFFICE 2,692,161

MULTIPLE-ROOM EXPANSIBLE HOUSE TRAILER

James Van Tassel, Santa Ana, Calif., assignor to Alert Development Corporation, Santa Ana, Calif., a corporation of California Application March 3, 1951, Serial No. 213,725

1 Claim. (Cl. 296—23)

This invention relates to expansible vehicles, and particularly relates to an automobile trailer providing housing accommodations.

Although house trailers, as such vehicles are usually called, have developed in size and in the luxury and completeness of their fittings and accommodations to an extent undreamed of only a few years ago, they still suffer numerous limitations imposed by their vehicular origin and occasional vehicular use. Most of their existence is spent in stationary condition in trailer camps, yet their size is regulated and limited by ordinances governing the use of highways. Rarely is wind resistance a factor of practical importance, yet their designs are streamlined to the complete elimination of exterior architectural features which go so far to make a house a charming home. Though used extensively in warm climates, there is no privacy beyond their walls, no provision for that out-of-door living which should be one of their main attributes and advantages.

It is an object of this invention to provide a house trailer which is compactible to conform to highway regulations and which is expansible to provide more commodious living quarters when it is parked.

A further object of my invention is to provide an expansible trailer of improved architecture which affords its occupants the privacy of separate wings for sleeping quarters or other indoor uses and a partially enclosed out-of-door living space.

Another object of my invention is to provide a house trailer having expansible wings which form a patio when expanded and which divide the main or fixed portion of the trailer into convenient living divisions when compacted thereinto, and which then brace and balance the trailer for road travel.

In my Patent No. 2,519,517, issued August 22, 1950, I have described an expansible trailer having a floor level below the tops of the supporting wheels, which is desirable not only for stability in road-travel but for ease of entrance when parked, in which certain sections of the floor were movable to provide for relative movement of the wheels and the floor of the movable body section. Also in my co-pending application Serial No. 133,293, filed December 16, 1949, now Patent No. 2,636,773, I have disclosed a movable body section having a floor which swings upwardly as a unit, thereby again not conflicting with the wheels during relative movement as a sliding floor would conflict. However, a floor which is permanently and completely sealed to its surrounding wall sills has advantages in excluding dirt and cold, and also provides greater rigidity and strength to the whole structure. While it is not my intention to confine my present invention to a structure having permanently sealed floors, as the floor described in my above-cited application could be used if desired, it is a further object of my invention to provide an expansible trailer so constructed that the floors of both the fixed and the movable portion may be permanently sealed to their respective sills if it be so desired, and yet affording the great advantage of having all the floors disposed well below the wheel-tops.

Other useful features and advantages of my invention will be pointed out as the following description of a preferred embodiment of the invention proceeds, or will be apparent from that description when considered with the accompanying drawings illustrative thereof, in which:

Fig. 1 is a perspective view of a trailer according to my invention, showing the trailer fully expanded, to provide a patio;

Fig. 2 is another perspective view showing the trailer partly expanded, to provide an L and a court sheltered on two sides;

Fig. 3 is a side elevational view of the trailer in compacted position;

Figure 4:
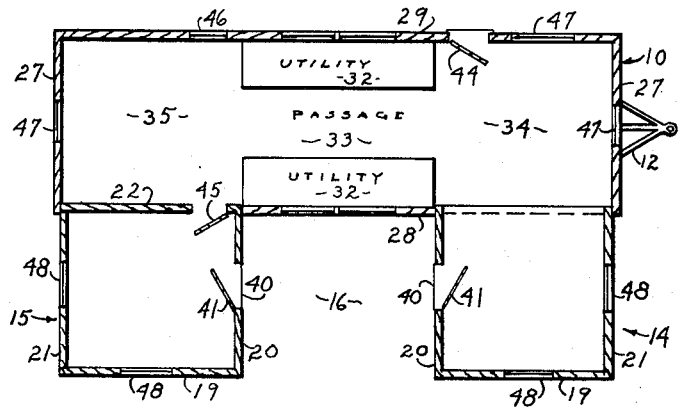
Figure 5:
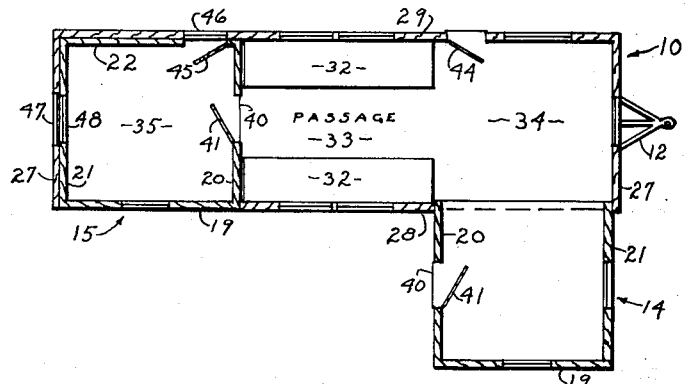
Figure 6:
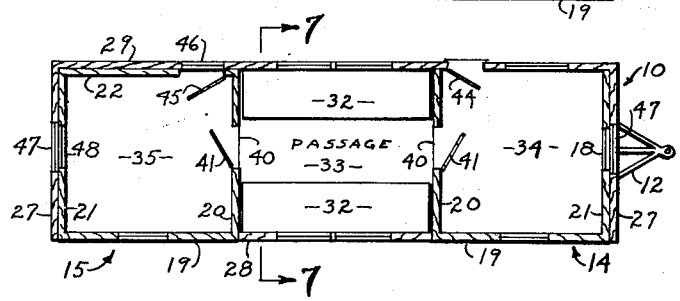
Figure 7:
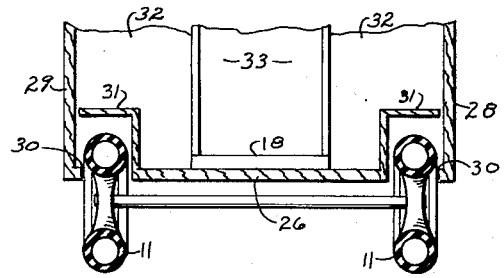

Figs. 4, 5, and 6 are floor plan views of the trailer in the positions of Figs. 1, 2, and 3, respectively; and Fig. 7 is a transverse vertical sectional view approximately on the line 7—7 of Fig. 6, and on a slightly enlarged scale.

Having reference now to the details of the drawings, I have shown a house trailer having a main body 10 mounted fixedly upon a chassis indicated by wheels 11 and drawbar 12, the wheels 11 being disposed substantially midway between the ends of the trailer, as is customary with long vehicles of this type and comprising either one or two pairs, two pairs being shown. Movable wings or L's 14 and 15 are arranged to telescope into the forward and rearward ends of the body 10 from one side, and preferably the same side thereof so as to form with the body 10, when withdrawn or extended therefrom, three sides of a patio 16. Each of the movable wings has a roof 17, a floor 18, an end wall 19, a wall 20 facing on the patio, and an opposite wall 21. One of the wings, for example, the rearward wing 15 if that is to be used as a bedroom, preferably has an interior wall 22 juxtaposed to the body space into which the wing is compactible; the other wing may be left open on its inner side to provide a large unified living room when extended.

The floors 18 are preferably sealed to the sills of the walls 19, 20 and 21, although they may be upwardly swingable about one margin as shown in my above-cited patent application Serial No. 133,293, in which case the wings may suitably be supported when extended by foldable cantilevers as also shown in that application. If the floors are permanently secured and sealed to the wall sills, the wings may be extensible on and supported by extension rails as shown in my above-cited Patent No. 2,519,517. The force necessary to move the wings between compacted and expanded positions may be exerted through any of the known appliances therefor, and suitable locking devices may also be obtained from the known art. As herein illustrated in Figs. 1 and 2, the wings 14 and 15 are supported when expanded by jacks 24.

The main body 10 has a roof 25 overlying the roofs 17, a floor 26 underlying the floors 18, end walls 27 outwardly encompassing the end walls 21, a side wall portion 28 between the wings 14 and 15, and a full side wall 29 opposite the portion 28. The side walls 28 and 29 will ordinarily be disposed outwardly from the vertical plane of the wheels 11, to afford the greatest possible body width, and as it is desired to have the floor 26 below the upper range of movement of the wheels, the floor has openings 30 through which the tops of the wheels may extend. Within the body 10 and above the wheels 11 are wheel boxes 31 (see Fig. 7) to enclose the upper portions of the wheels and permit the floor 26 to be disposed conveniently and safety close to ground-level. Utility structures 32 surmount and conceal the wheel boxes 31, and may comprise any of the usual house-keeping facilities such as kitchen, toilet, refrigerator, and storage space. The structures 32 define between them a passage 33 between a forward room 34, into which the wing 14 is telescopically movable, and a rearward room 35 into which the wing 15 is movable.

The wings 14 and 15 have doorways 40 and doors 41 in their juxtaposed patio walls 20, so placed that when the wings are compacted into the main body 10 the doorways 40 will be opposite the ends of the passage 33. Thus, when the trailer is compacted as shown in Figs. 3 and 6, it is divisible into three units, namely, the rooms 34 and 35 and the utility space 32—33, each separable from the others by one or more doors and thus affording indoor privacy. When only one of the wings is extended, as in Figs. 2 and 4, one large room is formed (if wing 15 is extended it may be two small rooms) open to the passage 33, with a small room at the other end of the trailer which may be closed off from the passage. When both wings are extended, as in Figs. 1 and 3, the main body 10 will be open from end to end, but by provision of the interior wall 22, one of the wings may be closed off as a bedroom.

With both of the wings extended, the patio 16 may be entered from either wing. An awning 42 may easily be mounted between the extended wings in hot weather. On the other hand, in cold weather, if the trailer is compacted, it will have double walls, double roofs, and double floors for a great part of its exposed area, for better insulation and the comfort of its occupants. As no moving of floor portions is necessary to permit movement of the wings relatively to the wheel boxes 31, there need be no trap-door floors to admit dirt or cold. This double thickness of construction will, of course, always obtain during road travel, to strengthen the trailer and afford better protection in the event of collision.

The construction presents further advantages in fenestration. Windows and other doors than the doors 41 may be placed as desired, but certain placements will follow more or less naturally. For example, as another door will be required for entrance and exit when the trailer is compacted and the doors 41 become interior doors, such a door 44 may suitably be placed in the side wall 29 opening into the forward room 34. In this position, as the wing 14 has no interior wall, the door 44 will open directly into the room 34 whether the trailer is compacted or expanded. If the wing 15 is provided with an interior wall 22, a door 45 is desirable therein. A window 46 may be placed in the side wall 29 directly opposite the door 45, and if the latter has a glass panel, the window 46 will still admit light, as a double window, when the wing is compacted. Other windows 47 in the main body 10 will be located with reference to windows 48 in the wings 14 and 15 so that vision through double windows is permitted during road travel.

It is to be understood that much of the foregoing description is offered as guidance in the construction of a trailer embodying the principles of my invention, and that such construction may be varied without departure from the spirit of the invention insofar as it does not depart from the scope of the appended claim, which more precisely sets forth the points of novelty which I desire to claim.

I claim:

In a vehicle of the class described, having a chassis, a housing body mounted on said chassis, and wheels on said chassis disposed inwardly from the side walls of said body and at substantial distances from the end walls of said body so as to provide room space entirely forward of said wheels and additional room space entirely rearward of said wheels: a floor for said body disposed below the upper range of movement of said wheels and having openings through which said wheels may extend upwardly of said floor; structures surmounting said openings and defining a passage between said room spaces; and a housing wing extensible to one side of said body and telescopically movable into one of said room spaces, said wing having four walls and a floor supported by said walls when said wing is extended; one of said walls being juxtaposed to one end of said passage-defining structures when said wing is compacted and having a door which is an exterior door when said wing is extended and which admits to said passage when said wing is compacted; that one of said walls juxtaposed to said one room space having a door providing passage between said one room space and said wing.

References Cited in the file of this patent

UNITED STATES PATENTS

| Number | Name | Date |
|---|---|---|
| 1,436,984 | Follett | Nov. 28, 1922 |
| 2,469,752 | Thomas | May 10, 1949 |
| 2,581,192 | La Fleur | Jan. 1, 1952 |
| 2,606,057 | Johnson | Aug. 5, 1952 |

FOREIGN PATENTS

| Number | Country | Date |
|---|---|---|
| 823,427 | France | Oct. 18, 1937 |